United States Patent [19]

Wainwright

[11] Patent Number: 4,875,144
[45] Date of Patent: Oct. 17, 1989

[54] FABRIC WITH ILLUMINATED CHANGING DISPLAY

[76] Inventor: Harry L. Wainwright, 918 Delaware Ave., Bethlehem, Pa. 18015

[21] Appl. No.: 96,557

[22] Filed: Sep. 14, 1987

[51] Int. Cl.[4] ............................................. F21L 15/08
[52] U.S. Cl. .................................... 362/103; 362/32; 362/252; 362/806
[58] Field of Search ................. 362/32, 103, 105, 106, 362/108, 252, 806, 808, 811

[56] References Cited

U.S. PATENT DOCUMENTS

| | | | |
|---|---|---|---|
| 3,184,872 | 5/1965 | Way | 40/457 X |
| 3,549,878 | 12/1970 | Bailey | 362/103 X |
| 4,110,818 | 8/1978 | Hempsey | 362/32 |
| 4,164,008 | 8/1979 | Miller et al. | 362/103 |
| 4,234,907 | 11/1980 | Daniel | 362/32 |
| 4,480,293 | 10/1984 | Wells | 362/108 |
| 4,570,206 | 2/1986 | Deutsch | 362/103 |
| 4,727,603 | 3/1988 | Howard | 362/103 |

FOREIGN PATENT DOCUMENTS 155157 9/1985 European Pat. Off. .............. 362/32

Primary Examiner—Stephen F. Husar
Attorney, Agent, or Firm—Joseph J. O'Keefe

[57] ABSTRACT

A fabric illuminated by the outer ends of a large number of optical fibers associated with the outer surface of the fiber in a manner to form an illuminated changing display of several figures. The fibers extend along the inner surface of the fabric, and the inner ends of a plurality of fibers are gathered into several bundles each of which engages a connector housing having a plurality of light sources. The light sources connect with a power source and an electronic control device which sequentially causes each light source to be activated in a programmed manner. Each illuminated light source emits light to the inner ends of fibers of the light sources associated bundle of fibers. The light travels through each fiber of the bundle to the outer ends of the fibers thereof where the light is emitted sequentially with the light from the ends of fibers of other bundles in the manner programmed by the electronic control device to form an illuminted changing decorative display of several figures.

3 Claims, 4 Drawing Sheets

FABRIC WITH ILLUMINATED CHANGING DISPLAY

BACKGROUND OF THE INVENTION

This invention relates to fabric illuminated with a changing design and more particularly to an article of clothing having a design formed by light emitting optical fibers which are sequentially illuminated in an animated manner.

Prior art illumination of garments is found in U.S. Pat. No. 4,164,008 to G. E. Miller, et al., U.S. Pat. No. 4,480,293 to P. S. Wells, U.S. Pat. No. 4,570,206 to C. Deutsch, and U.S. Pat. No. 4,602,191 to X. Davillia. These patents describe the use of light emitting diodes which connect with a printed circuit sheet on the interior of a garment and project through the garment to the outside surface.

Another manner of garment illumination is described in U.S. Pat. No. 3,549,878 to R. E. Balley, which discloses the use of bundles of fiber optics secured to selected outer portions of a garment. Individual fiber ends are turned outwardly from the bundles through the jacket surrounding them and illuminated by a light source, connected to a battery, positioned at the opposite ends of the bundles.

A light emitting fabric is disclosed in U.S. Pat. No. 4,234,907 to M. Daniel that describes the use of light emitting optical fibers woven into a fabric or uniform illumination and decoration. The individual fibers are gathered into a bundle at one end of the fabric and illuminated by a light source. Light traveling through the fibers is emitted in small amounts throughout the lengths of the fibers through small scratches in their outer coatings.

A moving pattern simulator is disclosed in U.S. Pat. No. 3,184,872 to F. C. Way. A display board is formed with perforations at selected locations to receive the ends of a plurality of light-conducting fibers. The opposite ends of the fibers are received in a support member 24 and arranged in a particular spacial relation so that when they are illuminated in sequence the desired motion of the light pattern appears at the face of the board. A light source spaced from the support member is used to illuminate the fiber conductors, and an opaque disk having a plurality of openings at strategic locations may be positioned between the light source and the ends of the fiber conductors to sequentially illuminate various ends of the conductors.

The prior art illuminated garments are bulky and stiff, the bulbs, diodes and fibers are difficult to replace, and they protrude from the fabric, generally, in an unprotected manner that make them susceptible to damage. In addition, the degree of illumination of the light emitting diodes is quite bright making them easy to see even in well-lighted environments. This makes them extremely obvious, and by their nature generally unacceptable for use in lightweight fabrics of thinner material and for which designers wish more subtle lighting effects. Optical fibers woven into a fabric and dependent upon scratches in their outer coatings for illumination are also impractical. The moving pattern simulator of U.S. Pat. No. 3,184,872 is cumbersome and totally unsuitable for incorporation in a garment.

SUMMARY OF THE INVENTION

The present invention overcomes the above mentioned and other disadvantages of the prior art.

It is an object of this invention to provide subtle, animated, pin-point illuminated enhancement for wearing apparel that is unobvious in daylight or in brightly lighted rooms and unobtrusive and decorative after dark and/or in rooms having a very low level of light.

It is also an object of this invention to provide a system in which hundreds or even thousands, of sequentially programmable lights are installed in apparel in a manner that adds very little or almost imperceptible additional weight to the garment and provides an illuminated changing display.

It is an object of this invention to provide a system which reduces the risk of broken optical fibers due to the stress attendant with the weaving of such fibers into the material of a garment.

Another object of this invention is to provide a system for adding illumination to lightweight fabrics without any noticeable bulges due to wires, bulbs or circuit boards that are difficult to conceal.

It is also an object of this invention to provide quickly detachable electronic light modules that, when removed, do not leave holes in the fabric in places of light sources, thus allowing the garment to be easily cleaned and eliminating the possibility of material fray around empty socket holes when the light sources are removed.

Yet another object of this invention is to provide interchangeable electronic light modules, which permit the points of light in the garment to change colors, animated sequences, timing and luminescence, depending upon the electronic controls.

The present invention relates to a fabric illuminated by the outer ends of a large number of optical fibers associated with the outer surface of the fabric in a manner to form an illuminated, changing or animated decorative display. The fibers extend along the inner surface of the fabric, and the inner ends of a plurality of fibers are gathered into several bundles each of which engages a connector housing, having a plurality of light sources. The light sources connect with a power source and an electronic control device which sequentially causes each light source to be activated. Each illuminated light source emits light to the inner ends of fibers of its associated bundle of fibers. The light travels through each fiber to its outer end where the light is emitted sequentially with the light from the ends of the fibers of other bundles in the manner programmed by the electronic control device to form an illuminated changing decorative display.

BRIEF DESCRIPTION OF THE DRAWINGS

The nature of the invention will be more clearly understood by reference to the following description, the appended claims and the several views illustrated in the accompanying drawings.

DESCRIPTION OF THE PREFERRED EMBODIMENT

Figure 1:
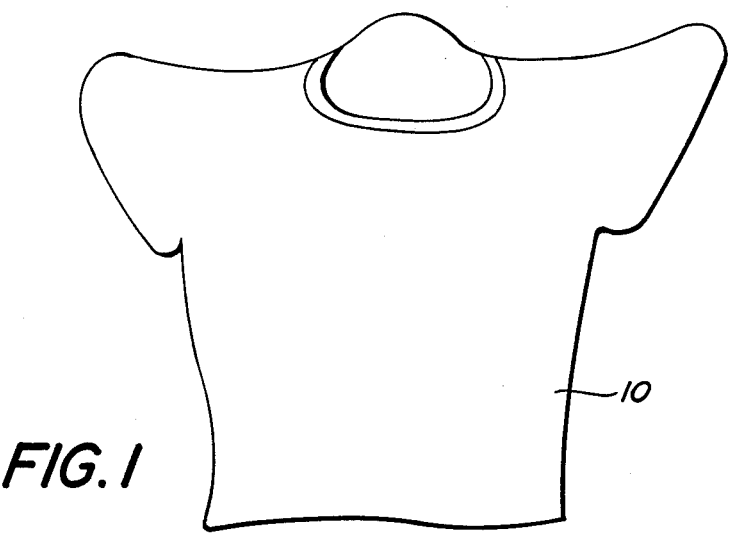
FIG. 1 is a front elevational view of a portion of a garment, which is equipped with the illuminating changing display of the present invention, as the garment would appear in a well-lighted area without any visible display.

In FIG. 1 there is shown a portion of a fabric garment 10 which incorporates an embodiment of this invention, as hereinafter described, in the form of a changing floral display. In FIG. 1, garment 10 is viewed in daylight or in a well lighted area and the floral display is not visible.

Figure 2:
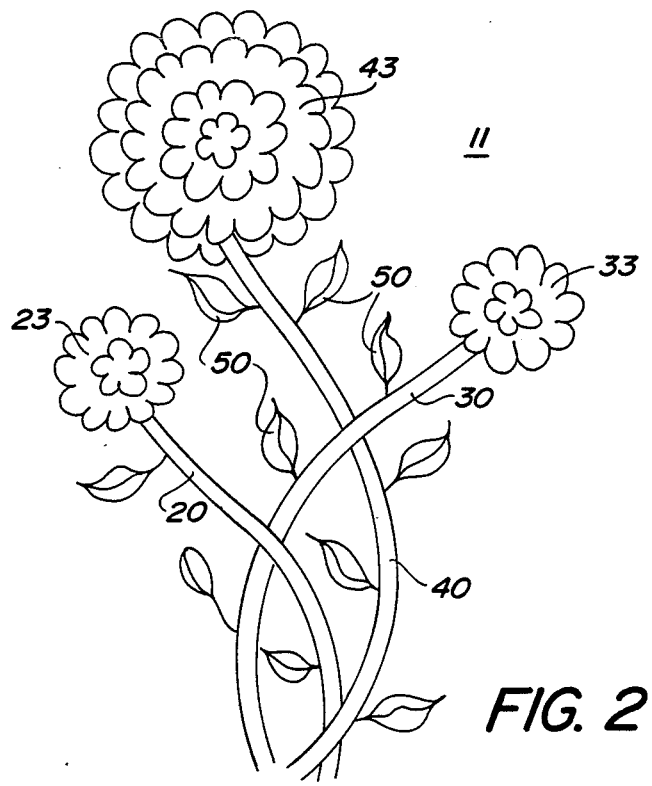
FIG. 2 is an enlarged view of the display portion only of the garment of FIG. 1, as equipped with the illuminating changing display of the present invention, showing, schematically, the illuminated third frame of the display as it would appear in a dark or dimly lighted area.

Referring to FIG. 2 there is shown the display portion only of the outside of a garment 10 that includes a floral display 11, as viewed in the dark, of a preferred embodiment of this invention. Display 11 includes flower stems 20, 30, and 40, leaves 50, and flower 23 at the end of stem 20, flower 33 at the end of stem 30 and enlarged flower 43 at the en of stem 40. Floral display 11 is illuminated by a large number of optical fibers that connect to garment 10 in a manner hereinafter described. The floral display is animated or given the appearance of changing by virtue of the several patterns in which the fibers are connected to the garment in three separate frames or figures as shown in FIGS. 3, 4 and 5 and grouped to be illuminated sequentially.

Figure 3:
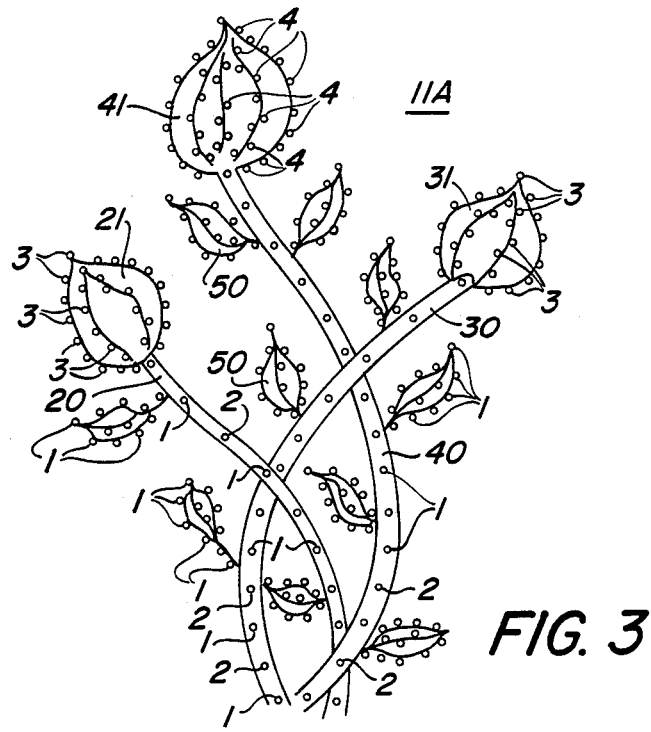
FIG. 3 is an enlarged view of the first frame of the garment display in the manner of the present invention showing schematically the ends of optical fibers that are illuminated to create such first frame display.
Figure 7:
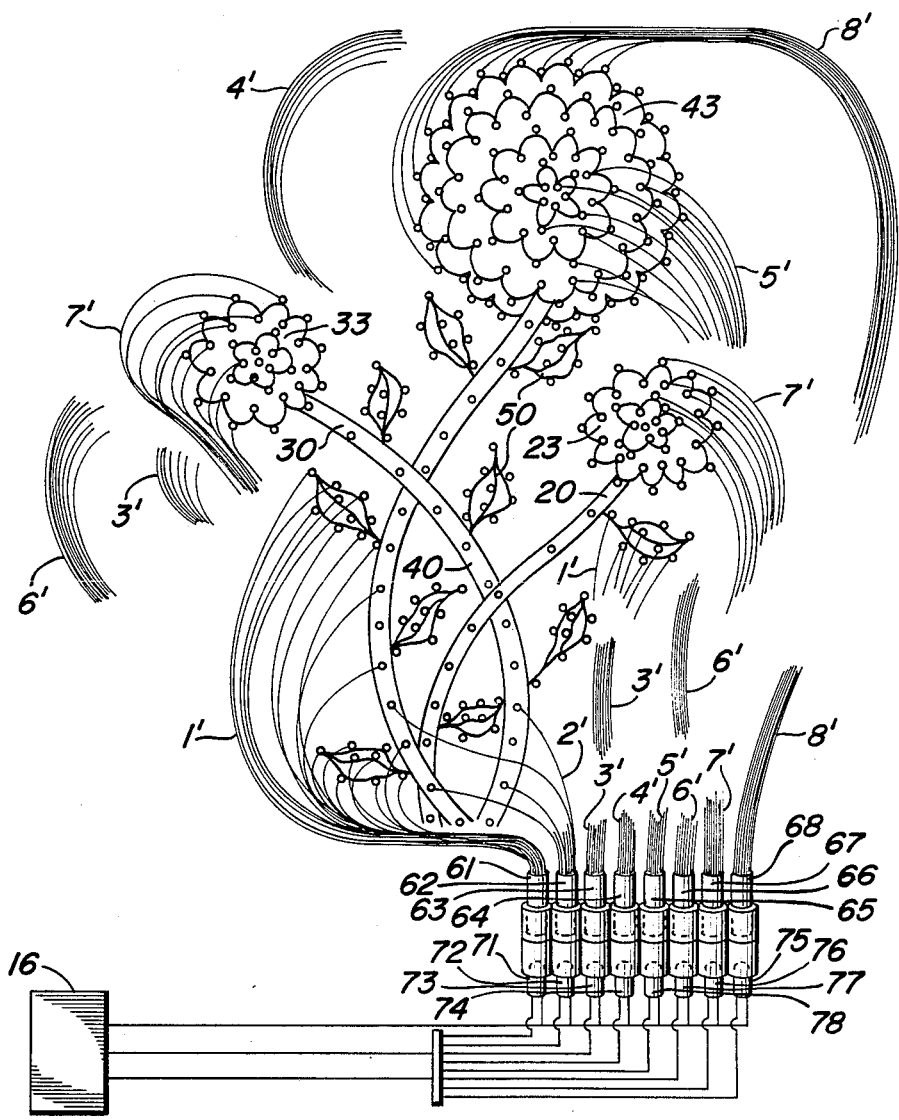
FIG. 7 is an enlarged back elevational view of the garment of FIG. 1, which is a mirror image of the front elevational view of the third frame of FIG. 5, illustrating, schematically, a portion of the embodiment of the present invention and the manner in which the optical fibers extend between their points of connection on the inside of the garment and the control portion of the invention.

As shown in FIG. 3, frame 1, the first floral display 11A appears with stems 20, 30 and 40 and leaves 50. A bud 21 is attached to the end of stem 20, a bud 31 to the end of stem 30, and a bud 41 to the end of stem 40. The ends 1 of a plurality of optical fibers 1', as shown in FIG. 7, are spaced alternately with the ends 2 of a plurality of fibers 2', also as shown in FIG. 7, along stems 20, 30 and 40 to illustrate the stems. The ends 1 of a plurality of optical fibers 1' as shown in FIG. 7, are spaced in a manner to illustrate each of leaves 50. In similar fashion the ends 3 of a plurality of optical fibers 3', as shown in FIG. 7, are spaced in a manner to illustrate each of buds 21 and 31, and the ends 4 of a plurality of optical fibers 4', as shown in FIG. 7, are spaced in a manner to illustrate bud 41.

Figure 4:
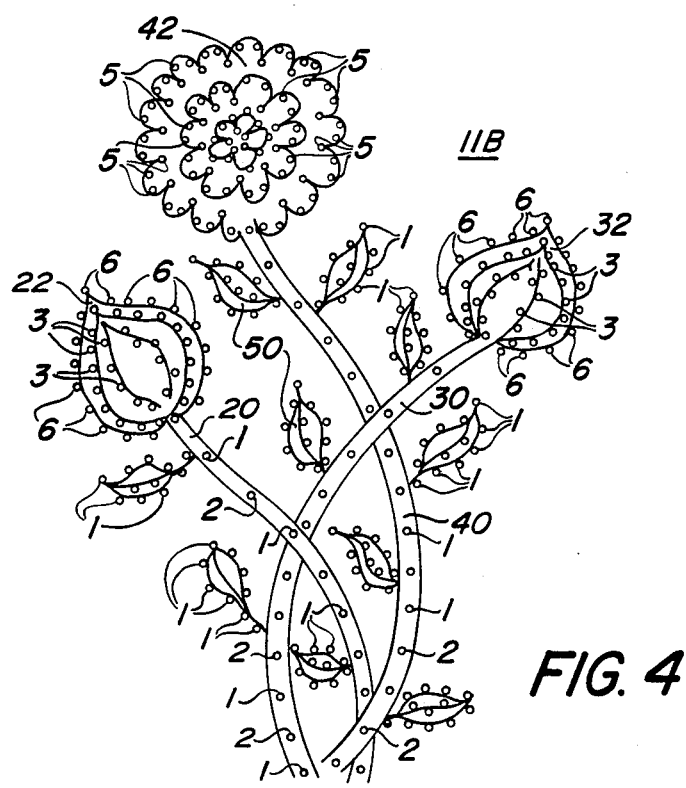
FIG. 4 is an enlarged view of the second frame of the garment display in the manner of the present invention showing schematically the ends of optical fibers that are illuminated to create such second frame display.
Figure 6:
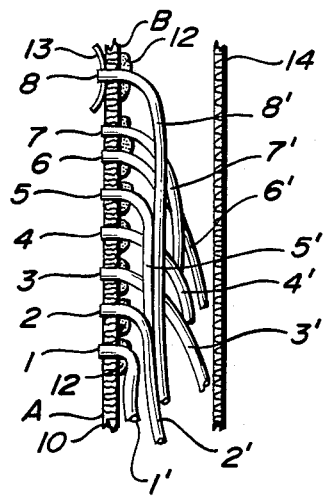
FIG. 6 is an enlarged schematic fragmentary cross-sectional view showing the manner in which optical fibers are connected to the fabric of the garment of FIG. 1 to produce an illuminated display according to the present invention.

In FIG. 4, frame 2, the second floral display 11B appears with substitution of flower 42 for bud 41 of FIG. 3, frame 1, and the substitution of enlarged buds 22 and 32 for buds 21 and 31 respectively, of FIG. 3, frame 1. The substitution of flower 42 is accomplished by having the ends 5 of a plurality of optical fibers 5', as shown in FIG. 6, spaced in a manner to illustrate flower 42. The enlarged buds 22 and 32 are depicted by having the ends 6 of a plurality of optical fibers 6', as shown in FIG. 7, spaced outside, i.e. on the outer periphery of, the optical fiber ends 3 which illustrate buds 21 and 31 of FIG. 2, frame 1.

Figure 5:
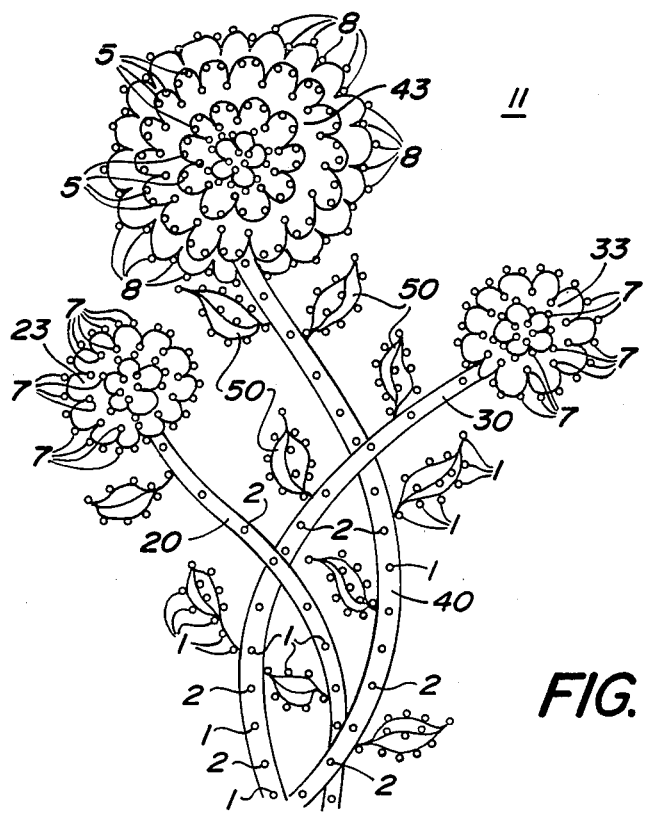
FIG. 5 is an enlarged view of the third frame of the garment display in the manner of the present invention showing schematically the ends of optical fibers that are illuminated to create such third frame display.

The final animation of flower 11 is shown in FIG. 5, frame 3. The third floral display 11 appears with the substitution of flowers 23 and 33 for enlarged buds 22 and 32, respectively, of FIG. 4 and by the substitution of enlarged flower 43 for flower 42 of FIG. 4. The substitution of flowers 23 and 33 is accomplished by having the ends 7 of a plurality of optical fibers 7', as shown in FIG. 7, spaced in a manner to illustrate each of flowers 23 and 33. The substitution of enlarged flower 43 is accomplished by having the ends 8 of a plurality of optical fibers 8' spaced outside, i.e. on the outer periphery of, the optical fiber ends 5 which illustrate flower 42 of FIG. 4, frame 2.

The manner in which the optical fibers associate with the fabric garment 10 is shown in FIG. 6. Each of the fibers, as exemplified by fibers 1' through 8' respectively, extends transversely through fabric garment 10 from inside surface B to outside surface A, and each fiber is secured to inside surface B by means of cement 12. In some instances it may be desirable to cement the fiber to both the inside surface B and outside surface A. It is also possible to fasten the ends of the fibers to the garment by fasteners, i.e. rivets, not shown. At times it may be desirable to have a sequin 13 mounted at the end of a fiber or fibers to enhance the light admitted from the fiber's end.

Garment 10 is provided with a thin liner 14 that extends throughout the garment to protect the fibers from accidentally being broken or torn from position by a person wearing the garment, particularly when the garment is being put on or removed. The liner is secured to the inside surface B of the garment in a manner well known to those skilled in the art, for example by Velcro fasteners, clips, buttons or stitching.

As shown in FIG. 7, the fibers designated 1' through 8' respectively, are assembled in a cooperative manner. For example, the individual fibers 1' are gathered adjacent their inner ends into a bundle which is held together by an insulator 61 that engages an upper portion of a connector housing 15. In similar fashion, individual fibers 2', 3', 4', 5', 6', 7', and 8' are each gathered adjacent their inner ends into a bundle which is held together by insulators 62, 63, 64, 65, 66, 67, and 68, respectively. Insulators 62-68, respectively, each engages an upper portion of connector housing 15. The lower end of connector housing 15 holds a plurality of light sources 71, 72, 73, 74,. 75, 76, 77, and 78, each of which aligns and cooperates with the inner end of one of the optical fiber bundles 1'-8', respectively. For example, light source 71 aligns with the inner ends of the bundle of fibers 1'. Light source 72 aligns with the inner ends of the bundle of fibers 2', etc. Each of the light sources connects with a compact electronic control box 16 which includes an energy source, computer chip and switch means, not shown, well known to those skilled in the art. Box 16 controls the programmed sequential lighting of the animated display and may be secured to liner 14 in a manner not shown.

The above described embodiment of the invention operates in the following manner when a switch, not shown, of control box 16 is activated. Flower display 11A of FIG. 3, frame 1, is illuminated for a fraction of a second by the continuous emission of light from fiber ends 1 of stems 20, 30 and 40, and leaves 50 and from fiber ends 3 of buds 21 and 31 and from fiber ends 4 of bud 41. There is an intermittent emission of light from fiber ends 2 of stems 20, 30, and 40.

There is a sequential change from flower display 11A to flower display 11B of FIG. 4, frame 2 for a fraction of a second. This change actuates the continuous emission of light from fiber ends 1 of stems 20, 30, and 40, and leaves 50, from fiber ends 3 of enlarged buds 22 and 32 and from fiber ends 5 of flower 42. There is an intermittent emission of light from fiber ends 2 of stems 20, 30 and 40 and from fiber ends 6 of the outer edges of enlarged buds 22 and 32.

There is another sequential change from flower display 11B to flower display 11 of FIG. 5, frame 3, for a fraction of a second. This change actuates the continuous emission of light from fiber ends 1 of stems 20, 30 and 40, and leaves 50, from fiber ends 5 of enlarged flower 43, and from fiber ends 7 of flowers 23 and 33. There is an intermittent omission of light from fiber ends 2 of stems 20, 30, and 40, and from fiber ends 8 of the outer edges of enlarged flower 43.

While the above animated illuminated floral display may be done in white light or any other single color, it becomes more attractive when accomplished in a variety of colors. For example, the floral display 11A of FIG. 3, frame 1, may be all green; the floral display of 11B, FIG. 4, frame 2, may be all green, with the exception of fiber ends 5 of flower 42 which may be red; and in floral display 11 of FIG. 5, frame 3, fiber ends 5 and 8 of enlarged flower 43 may be red, fiber ends 7 of flowers 23 and 33 may be yellow, and the remainder of the fiber ends for the stems 20, 30 and 40 and leaves 50 may remain green as in the other displays. The change of colors is accomplished by using different colored light sources 71 through 78.

The above described embodiment of the invention is only one example of the type of illuminated, changing or animated display that can be incorporated into a fabric, and particularly in garments. The invention enables low level light emission from a few to thousands of sequentially programmable pin-point sources. A display can be created with thousands of fibers, with multi colored light sources and with a control system that is programmed to illuminate the ends of the fibers in any manner desired. The light weight of optical fibers coupled with the compact control box that can be either fitted into the liner or a pocket of the garment, or supported separately on a belt, permits the invention to be used for extremely lightweight materials with little, if any, indication of any associated electronics that in prior art devices are somewhat bulky. Another important feature of the invention is the ease with which the bottom portion of the control housing and the associated wiring and control box 16 can be removed from the garment so that it may be washed or dry cleaned without any complication. Another important feature of the invention is that it permits the use of lighted patterns on materials designed for hostile environments such as the vacuum of space or the blackness of sea depths.

In assembling a garment with the above described invention it is important that the optical fibers extend loosely from their inner ends, where they are gathered into bundles, and their outer ends, where they are joined to the garment. These are the only two points at which the fibers are joined to the garment. The reason the fibers are permitted to extend loosely between the garment inner surface B and liner 14 is to prevent them from being broken or pulled from the garment by the movement of a person wearing the garment. To avoid pulling fiber ends from the garment it is important to have enough slack in the fibers to permit their being moved or jostled. This is accomplished by having the length of each fiber about twenty percent to fifty percent longer than the straight line distance between the fiber outer end and the position of its insulator in connector housing 15.

The preferred embodiment of the invention described above uses three separate figures, which are sequentially illuminated to first show a floral display of stems and buds, second show a floral display of stems, two larger buds and a flower, and third show a floral display of stems, two smaller flowers and an enlarged flower. The number of fiber ends indicated in the Figures were few for illustrative purposes. In a garment hundreds or thousands of fiber ends may be used to illustrate any desired number of frames or figures which may be displayed on the front, the back, or the arms of the garment in any desired arrangement. The time during which a frame or figure is illuminated and the sequential illumination of various frames or figures is a function of the programmed electronic control Optical fibers are well known to those skilled in the art and may be purchased from a number of commercial sources. The fibers are flexible, elongated plastic filaments that are available in bundles of various numbers of fibers, e.g. sixty-five, and the individual fibers may be obtained in several different thicknesses.

The preferred garment fabric to be illuminated by the above described invention is made from a combination of natural and artificial fibers, e.g. thirty-five percent cotton and sixty-five percent polyester. More delicate fabrics may be used, and with such fabrics it may be desirable to secure the fiber ends to the fabric with mechanical fasteners to avoid chemical damage to the fabric by the use of cement.

The preferred source of power for the above described invention is a 9-volt battery such as is used with small electronic devices. Depending upon the number of light sources used to illuminate a fabric, smaller batteries may be adequate, particularly if the fiber ends are not illuminated for any extended period of time.

I claim:

1. A fabric with an illuminated animated display including a first frame and a second frame and comprising:
   (A) a fabric outer surface;
   (B) a first plurality of flexible optical fibers each having a first end a second end;
   (C) a second plurality of flexible optical fibers each having a first end and a second end;
   (D) said first plurality of optical fibers gathered into a first bundle;
   (E) said second plurality of optical fibers gathered into a second bundle;
   (F) a portion of said second ends of said first bundle of optical fibers secured to said fabric and extending to said fabric outer surface to form at least a portion of said first and second frames of said display;
   (G) a portion of said second ends of said second bundle of optical fibers secured to said fabric and extending to said fabric outer surface to form at least a portion of said second frame of said display;
(H) a first light source means adjacent said first ends of said first bundle of optical fibers to emit light to said first ends and through said fibers to sequentially illuminate said second ends forming at least a portion of said first and second frames of said display on said fabric outer surface;
(I) a second light source means adjacent said first ends of said second bundle of optical fibers to emit light to said first ends and through said fibers to sequentially illuminate said second ends forming at least a portion of said second frame of said display on said fabric outer surface to create the appearance of animation of said display.

2. The fabric of claim 1 further including circuit means connecting each said first and second light source means to a power source means and program control means to energize each said light source means in a sequential manner to illuminate in a sequential manner at least a portion of said first frame and said second frame of said display on said fabric to create the appearance of animation of said display.

3. A fabric with an illuminated animated display including a first frame, a second frame and a third frame and comprising:
(A) a fabric outer surface;
(B) a first plurality of flexible optical fibers each having a first end and a second end;
(C) a second plurality of flexible optical fibers each having a first end and a second end;
(D) a third plurality of flexible optical fibers each having a first end and a second end;
(E) said first plurality of optical fibers gathered into a first bundle;
(F) said second plurality of optical fibers gathered into a second bundle;
(G) said third plurality of optical fibers gathered into a third bundle;
(H) a portion of said second ends of said first bundle of fibers secured to said fabric to form at least a portion of said first, second and third frames of said display;
(I) a portion of said second ends of said second bundle of fibers secured to said fabric to form at least a portion of said second and third frames of said display;
(J) a portion of said second ends of said third bundle of fibers secured to said fabric to form at least a portion of said third frame of said display;
(K) a first light source means adjacent said first ends of said first bundle of optical fibers to emit light to said first ends and through said fibers to said second ends forming at least a portion of said first, second and third frames of said display on said fabric;
(L) a second light source means adjacent said first ends of said second bundle of optical fibers to emit light to said first ends and through said fibers to said second ends and forming at least a portion of said second and third frames of said display on said fabric;
(M) a third light source means adjacent said first ends of said third bundle of optical fibers to emit light to said first ends and through said fibers to said second ends forming at least a portion of said third frame of said display on said fabric;
(O) circuit means connecting each said first, second and third light source means to a power source means and program control means to energize each said light source means in a sequential manner to illuminate in a sequential manner at least a portion of said first, second and third frames of said display on said fabric to create the appearance of animation of said display.

* * * * *